United States Patent [19]

Aoyama et al.

[11] 3,971,752

[45] July 27, 1976

[54] FLAME RETARDING POLYESTER COMPOSITION

[75] Inventors: Toshikazu Aoyama, Nagoya; Yukinori Kimata, Gifu; Hotuma Okasaka, Nagoya; Hiroshi Kodama, Nagoya; Naoya Yoda, Nagoya, all of Japan

[73] Assignee: Toray Industries, Inc., Tokyo, Japan

[22] Filed: Dec. 23, 1974

[21] Appl. No.: 535,952

[30] Foreign Application Priority Data

Dec. 26, 1973 Japan .............................. 49-144066

[52] U.S. Cl. ........................ 260/40 R; 260/45.75 B; 260/DIG. 24
[51] Int. Cl.$^2$ ...................... C08K 3/22; C08K 5/03; C08K 5/06
[58] Field of Search ..... 260/40 R, DIG. 24, 45.75 B

[56] References Cited

UNITED STATES PATENTS

| | | | |
|---|---|---|---|
| 3,671,487 | 6/1972 | Abalins | 260/40 R |
| 3,751,396 | 8/1973 | Gall | 260/40 R |

*Primary Examiner*—Lewis T. Jacobs
*Assistant Examiner*—S. M. Person

[57] ABSTRACT

A glass fiber reinforced flame retarding polyester composition containing decabromodiphenyl ether and/or decabromodiphenyl together with antimony trioxide wherein the ratio by weight of bromine atom to antimony atom is within the range of 0.15 to 0.29.

The composition has excellent durability for thermal degradation and improved coloring properties in shaped form.

5 Claims, No Drawings

FLAME RETARDING POLYESTER COMPOSITION

BACKGROUND OF THE INVENTION

This invention relates to a flame retarding thermoplastic polyester composition reinforced by glass fibers. More specifically, this invention relates to a glass fiber reinforced flame retarding thermoplastic polyester composition which comprises (a) a thermoplastic polyester, (b) decabromodiphenylether and/or decabromodiphenyl and (c) antimony trioxide, and which possesses excellent durability for thermal degradation and improved coloring properties in shaped form.

Thermoplastic polyesters such as polyethylene terephthalate and polybutylene terephthalate have a variety of excellent physical properties. Especially polybutylene terephthalate has recently attracted considerable interest as a molding resin material, because of its excellent moldability.

Such polyesters have been used as engineering plastics for example as raw materials for mechanical parts of various machines, electrical equipment and parts of motor cars. Recently it has been strongly desired that those engineering plastics be provided with fire-proof properties, that is the flame retardancy, in addition to well-balanced ordinary physical and chemical properties. Nowadays, such properties are indispensable to provide in thermoplastic polyesters in order to enlarge their use as engineering plastics.

The thermoplastic polyesters generally have more excellent heat resistant properties than other engineering plastic resins, and they also have excellent durability for thermal degradation. For this reason they are expected to be the most suitable synthetic resins for use as the raw materials for electrical equipment and parts of motor cars, if they are given flame retarding properties without losing their well-balanced mechanical properties.

Since fiber reinforced thermoplastic polyesters are usually used at a temperature higher than 100°C, it is strongly desired to give them excellent heat-resistance and flame retarding properties.

Heretofore flammable organic polymers have been made flame retardant by adding a flame retarding agent such as organic halogen compound, a phosphorus compound, a large amount of inorganic material or their combination.

Generally speaking, however, the flame retarding agents deteriorate the original physical properties of the base polymer, and therefore it is of importance to find a good combination of organic polymer and flame retarding agent. In respect of polyesters several methods have been proposed.

For example, Japanese Patent Publication (Kokai) No. 46-2086 discloses combined use of decabromodiphenyl and antimony trioxide as a flame retarding agent.

According to this method it is possible to give reduced flammability to a glass fiber reinforced polyester resin, but the polyester composition thus obtained is not satisfactory in durability for thermal degradation, which is an important physical property and is required for engineering plastics.

When a combination of a halogenated aromatic compound and antimony trioxide is used as a flame retarding agent, it has been believed that the best atomic ratio of halogen to antimony is about 3.

However a flame retarding polyester containing such a flame retarding agent does not have improved coloring properties in its shaped form because of using the halogenated aromatic compound and antimony trioxide in the ratio referred to hereinabove.

Thus, the object of the present invention is to provide a fiber reinforced flame retarding thermoplastic polyester composition having excellent durability for thermal degradation. Another object of the present invention is to provide a fiber reinforced and flame retarding thermoplastic polyester composition which is moldable to form a shaped article having improved coloring properties.

SUMMARY OF THE INVENTION

We now have found that fiber reinforced polyester can be given the property of reduced flammability by adding a combined flame retarding agent consisting of a specific halogenated aromatic compound and a large excess of antimony trioxide, and the flame retarding polyester composition thus obtained has excellent durability for thermal degradation and produces a shaped article having improved coloring properties.

The present invention is a flame retarding thermoplastic polyester composition reinforced by glass fiber which comprises 100 parts by weight of a glass fiber reinforced thermoplastic polyester, 2 to 9 parts by weight of at least one flame retarding agent selected from the group consisting of decabromodiphenylether and decabromodiphenyl, and 12 to 30 parts by weight of antimony trioxide, wherein the ratio by weight of bromine atom to antimony atom is within the range of 0.15 to 0.29.

The glass fiber reinforced polyester used in the present invention may be comprised of 98 to 40 parts by weight of a thermoplastic polyester and 2 to 60 parts by weight of glass fibers, preferably 95 to 60 parts of polyester and 5 to 40 parts by weight of glass fibers.

The thermoplastic polyester may preferably be a linear aromatic polyester which is constituted by at least one dicarboxylic acid component selected from the group consisting of terephthalic acid, 2, 6-naphthalene dicarboxylic acid and 1, 2-bis-(4-carboxyphenoxy) ethane, and at least one diol component selected from the aliphatic diols having a carbon number of 2 to 6.

Examples of the thermoplastic polyester are polyethylene terephthalate, polypropylene terephthalate, polybutylene terephthalate, polyhexamethylene terephthalate, polyethylene-2, 6-naphthalate, polybutylene-2, 6-naphthalate, polyhexamethylene-2, 6-naphthalate, poly-1, 4-cyclohexylene dimethylene terephthalate, poly-1, 4-cyclohexylene dimethylene terephthalate/isophthalate copolymer, copolyester derived from bisphenol A, terephthalic acid and isophalic acid, polyethylenebenzoate and polyethylene-bis($\alpha$, $\beta$-phenoxy)ethane-4, 4'-carboxylate. Among these polyesters polyethylene terephthalate and polybutylene terephthalate are most preferable.

These polyesters may be modified by replacing at most 20 mol % of the main dicarboxylic acid or diol components with other copolymerizable dicarboxylic acids or diols respectively.

A blend containing more than 70% by weight of these polyesters and not more than 30% by weight of other organic polymer may be used in the present invention. The glass fiber may be commercially available, and either short fiber type or long fiber type may be used in the present invention.

In the present invention it is essential to use a specific halogenated aromatic compound together with antimony trioxide as a flame retarding agent. The specific halogenated aromatic compound is selected from the group consisting of decabromodiphenylether and decabromodiphenyl. It is also essential to determine the amounts of the specific halogenated aromatic compound and antimony trioxide so that the ratio by weight of bromine atom to antimony atom falls within the range of 0.15 to 0.29, preferably 0.20 to 0.27.

The amount of decabromodiphenylether or decabromodiphenyl may be 2 to 19, preferably 3 to 8 parts by weight per 100 parts by weight of a glass fiber reinforced thermoplastic polyester.

The amount of antimony trioxide may be 12 to 30, preferably 15 to 24 parts by weight. When the amount of the halogenated aromatic compounds and antimony trioxide is less than the above mentioned lower limits, the polyester composition does not have enough flame retardance.

When the amount is more than the upper limits, the mechanical properties of the composition are deteriorated.

A Br/Sb ratio of less than 0.15 does not give enough flame retardancy and a ratio more than 0.29 gives only inferior durability for thermal degradation. As is clearly illustrated in the examples, the composition of this invention has excellent durability for thermal degradation and improved coloring properties in shaped form, as well as well-balanced mechanical properties.

The above mentioned merits of the present invention are derived from both the choice of specific halogenated aromatic compound and their combined use with antimony trioxide in a Br/Sb ratio by weight of 0.15 to 0.29.

The glass fiber reinforced flame retarding polyester composition of this invention may further contain coloring agents such as dyes and pigments, crystallizing agents, fillers, reinforcing agents, lubricants, plasticizers, heat resistant agents, absorbers of ultraviolet rays, mold release agents, expanding agents, thickeners and coupling agents.

Blending of glass fibers, halogenated aromatic compound and antimony trioxide with a thermoplastic polyester may be carried out by conventional methods at any time before molding.

The composition of the present invention may be molded to a shaped article by a conventional method such as extrusion molding, injection molding or press molding.

The following examples further illustrate the present invention but they are not intended to limit it thereto;

EXAMPLE 1

Polybutylene terephthalate having an intrinsic viscosity of 0.80 (o-chlorophenol solv. at 25°C) was mixed in a ratio as shown in Table 1 with decabromobiphenylether (DBE), antimony trioxide and 6 mm length of chopped strand glass fiber, and extruded at 250°C into pellets using a 65 mm$\phi$ extruder.

These pellets were dried at 130°C for 5 hours in a vacuum oven and subsequently molded into test pieces using an in-line screw type injection molding machine maintained at 250°C on the cylinder and nozzle and 40°C on the mold.

The molded specimens were tested for tensile properties, flexural properties, impact strength, heat distortion temperature and flammability in ASTM D-638, D-790, D-256, D-648 and UL-94 methods, respectively. Furthermore, the long-term test of durability for thermal degradation was carried out at 170°C in air. The results are summarized in Table 1 and 2.

As shown in Table 1 and 2, when Br/Sb ratio by weight is changed keeping the total content of DBE and antimony trioxide at 25 parts by weight, Br/Sb ratio of more than 0.25 does not give a remarkable improvement in respect to flame resistance and mechanical properties. On the contrary, the best durability for thermal degradation in long term test was obtained at Br/Sb ratio of 0.25.

EXAMPLE 2

The same experiments as in Example 1 were carried out except using 17 wt parts of the total content of DBE and antimony trioxide.

The composition in blend and testing results are summarized in Table 3 and 4. As shown in the tables, when the content of DBE and antimony trioxide is 17 wt parts, the mechanical properties are excellent over every ratio of Br/Sb used in the experiments.

In respect of the flame retardance, however, excellent results were obtained only with Br/Sb ratio of more than 1.99, and when the ratio is less than 0.13, an inferior flame retardance was obtained.

The results of heat stability tests indicate that the durability for thermal degradation becomes remarkably poor in the range of Br/Sb ratio of more than 0.5, but is unexpectedly improved with the ratio of less than 0.29.

EXAMPLE 3

From Examples 1 and 2 it was confirmed that the heat stability is improved with a Br/Sb ratio of less than 0.30. This example demonstrates how the total content of DBE and antimony trioxide affects the physical properties of polyester composition when the Br/Sb ratio is kept at 0.27. The total content of DBE and antimony trioxide was varied between 13 and 38 parts by weight as shown in Table 5.

The results summarized in Table 5 indicates that with the total content of more than 18 parts by weight an excellent flame retardance of the molded articles was obtained. When the total content increased over 33 parts by weight, the mechanical properties became gradually poor and with the total content of more than about 38 parts by weight the impact strength was deteriorated.

EXAMPLE 4

The same experiment as in Example 1 was carried out, except that the intrinsic viscosity of PBT was varied to 0.83 and decabromobiphenyl(DBB) was used instead of DBE.

The results are summarized in Table 6 and 7.

From Table 6 and 7, it is concluded that the superior heat-stability is obtained with a Br/Sb ratio of less than 0.30 using DBB.

Furthermore it is also confirmed that epoxy-compounds unexpectedly improve mechanical properties of molded articles as indicated by the result of exp. No. 516.

EXAMPLE 5

The same experiments as in example were carried out except using various thermoplastic polyesters instead of polybutyleneterephthalate.

The results are shown in Table 8.

The Compositions are as follows;

| | |
|---|---|
| Polyester | 70 wt% |
| Glass fiber | 30 wt% |
| DBE and Antimony trioxide | various contents listed in the Table |

From these examples we can see that various kinds of thermoplastic polyester can be given an excellent flame retardance and durability for thermal degradation according to the present invention.

Table 2

| Experiment No. | | Unnotched Izod impact strength retention (%) | | | |
|---|---|---|---|---|---|
| | | EX-502 | EX-503 | EX-505 | EX-506 |
| Br/Sb ratio | | 0.25 | 0.47 | 2.12 | 5.23 |
| | 0 | 100 | 100 | 100 | 100 |
| Heat aging | 10 | 87 | 52 | 40 | 42 |
| time | 20 | 82 | 49 | 40 | 37 |
| (days) | 30 | 80 | 48 | 39 | 32 |
| at 170°C | 40 | 79 | 46 | 38 | 31 |
| | 50 | 79 | 42 | 38 | 30 |
| | 60 | 78 | 40 | 32 | 27 |

Table 3

| Experiment No. | | Units | EX-508 | EX-509 | EX-510 | EX-511 | EX-512 | EX-513 |
|---|---|---|---|---|---|---|---|---|
| Blend Composition | PBT | wt. parts | 70 | 70 | 70 | 70 | 70 | 70 |
| | Glass fiber | " | 30 | 30 | 30 | 30 | 30 | 30 |
| | DBE | " | 2.0 | 2.8 | 3.8 | 57 | 11.3 | 13.2 |
| | $Sb_2O_3$ | " | 15.0 | 14.2 | 13.2 | 11.3 | 5.7 | 3.8 |
| | Br/Sb ratio | wt. ratio | 0.13 | 0.20 | 0.29 | 0.50 | 1.99 | 3.49 |
| Mechanical properties | Tensile strength | $Kg/cm^2$ | 1310 | 1280 | 1260 | 1300 | 1290 | 1250 |
| | Tensile elongation | % | 3.2 | 3.0 | 3.0 | 3.1 | 3.0 | 2.9 |
| | Flexural strength | $Kg/cm^2$ | 1850 | 1810 | 1825 | 1830 | 1820 | 1860 |
| | Flexural coefficient | $Kg/cm^2 \times 10^4$ | 8.04 | 8.15 | 8.20 | 7.95 | 8.10 | 8.15 |
| | Izod Impact strength | | | | | | | |
| | notched (1/2"t) | Kg.cm/cm | 6.4 | 6.5 | 6.4 | 6.7 | 6.7 | 6.8 |
| | unnotched (1/8"t) | $Kg.cm/cm^2$ | 54.3 | 53.6 | 55.1 | 56.3 | 55.7 | 54.8 |
| | Heat distorsion temp. at 18.6 $Kg/cm^2$ fiber stress | °C | 204 | 203 | 203 | 202 | 201 | 200 |
| Flammability | 1/8"t | | 94HB | 94VE-2 | 94VE-2 | 94VE-0 | 94VE-0 | 94VE-0 |
| | 1/16"t | | " | 94HB | " | 94VE-2 | " | " |
| | 1/32"t | | " | " | 94HB | 94HB | " | " |

Table 4

| Experiment No. | | Unnotched Izod impact strength retention (%) | | | |
|---|---|---|---|---|---|
| | | EX-509 | EX-510 | EX-511 | EX-512 |
| Br/Sb ratio | | 0.20 | 0.29 | 0.50 | 1.99 |
| | 0 | 100 | 100 | 100 | 100 |
| | 10 | 84 | 60 | 45 | 44 |
| Heat aging | 20 | 74 | 53 | 36 | 32 |
| time | 30 | 72 | 49 | 30 | 27 |
| (days) at 170°C | 40 | 71 | 45 | 25 | 23 |
| | 50 | 72 | 45 | 20 | 22 |
| | 60 | 71 | 45 | 21 | 22 |

Table 1

| Experiment No. | | Units | EX-501 | EX-502 | EX-503 | EX-504 | EX-505 | EX-506 |
|---|---|---|---|---|---|---|---|---|
| Blend Composition | PBT | wt. parts | 70 | 70 | 70 | 70 | 70 | 70 |
| | Glass fiber | " | 30 | 30 | 30 | 30 | 30 | 30 |
| | DBE | " | 2 | 5 | 8 | 13 | 17 | 21 |
| | $Sb_2O_3$ | " | 23 | 20 | 17 | 12 | 8 | 4 |
| | Br/Sb ratio | wt. ratio | 0.09 | 0.25 | 0.47 | 1.08 | 2.12 | 5.23 |
| Mechanical properties | Tensile strength | $Kg/cm^2$ | 1260 | 1280 | 1280 | 1300 | 1270 | 1280 |
| | Tensile elongation | % | 3.0 | 3.2 | 3.0 | 2.9 | 3.0 | 3.0 |
| | Flexural strength | $Kg/cm^2$ | 1810 | 1790 | 1850 | 1830 | 1850 | 1820 |
| | Flexural coefficient | $Kg/cm^2 \times 10^4$ | 8.20 | 8.15 | 7.95 | 8.10 | 8.05 | 8.10 |
| | Izod Impact strength | | | | | | | |
| | notched (1/2"t) | Kg.cm/cm | 5.9 | 6.0 | 5.8 | 6.1 | 6.2 | 6.1 |
| | unnotched (1/8"t) | $Kg.cm/cm^2$ | 54.1 | 55.3 | 57.3 | 56.2 | 56.8 | 57.2 |
| | Heat distorsion temp. at 18.6 $Kg/cm^2$ fiber stress | °C | 206 | 204 | 202 | 201 | 200 | 201 |
| Flammability | 1/8"t | | 94VE-2 | 94VE-0 | 94VE-0 | 94VE-0 | 94VE-0 | 94VE-0 |
| | 1/16"t | | 94HB | " | " | " | " | " |
| | 1/32"t | | 94HB | " | " | " | " | " |

Table 5

| Experiment No. | | Units | EX-514 | EX-515 | EX-516 | EX-517 | EX-518 | EX-519 |
|---|---|---|---|---|---|---|---|---|
| Blend Composition | PBT | wt. parts | 70 | 70 | 70 | 70 | 70 | 70 |
| | Glass fiber | " | 30 | 30 | 30 | 30 | 30 | 30 |
| | DBE+$Sb_2O_3$ | " | 13 | 18 | 23 | 28 | 33 | 38 |
| | DBE | " | 2.8 | 3.8 | 4.9 | 6.0 | 7.0 | 8.1 |
| | $Sb_2O_3$ | " | 10.2 | 14.2 | 18.1 | 22.0 | 26.0 | 29.1 |
| | Br/Sb ratio | wt. ratio | 0.27 | 0.27 | 0.27 | 0.27 | 0.27 | 0.27 |
| | Tensile strength | $Kg/cm^2$ | 1280 | 1260 | 1250 | 1250 | 1190 | 1030 |
| | Tensile elongation | % | 3.1 | 3.0 | 3.0 | 3.0 | 2.8 | 2.4 |

Table 5-continued

| Experiment No. | | Units | EX-514 | EX-515 | EX-516 | EX-517 | EX-518 | EX-519 |
|---|---|---|---|---|---|---|---|---|
| Mechanical properties | Flexural strength | Kg/cm$^2$ | 1810 | 1830 | 1790 | 1830 | 1660 | 1430 |
| | Flexural coefficient | Kg/cm$^2$×10$^4$ | 8.15 | 8.12 | 8.03 | 8.70 | 9.10 | 10.50 |
| | Izod Impact strength notched (1/2"t) | Kg.cm/cm | 6.1 | 5.9 | 5.9 | 5.4 | 4.3 | 3.4 |
| | unnotched (1/8"t) | Kg.cm/cm$^2$ | 54.2 | 53.9 | 51.5 | 47.3 | 40.4 | 28.1 |
| | Heat distorsion temp. at 18.6 Kg/cm$^2$ fiber stress | °C | 204 | 203 | 204 | 207 | 210 | 216 |
| Flammability | 1/8"t | | 94HB | 94VE-2 | 94VE-0 | 94VE-0 | 94VE-0 | 94VE-0 |
| | 1/16t | | " | " | " | " | " | " |
| | 1/32"t | | " | " | " | " | " | " |

Table 6

| Experiment No. | | Units | EX-514 | EX-515 | EX-516 | EX-517 | EX-518 |
|---|---|---|---|---|---|---|---|
| Blend Composition | PBT | wt. parts | 70 | 70 | 70 | 80 | 80 |
| | Glass fiber | " | 30 | 30 | 30 | 20 | 20 |
| | DBB | " | 4.5 | 12 | 4.5 | 5.0 | 14 |
| | Sb$_2$O$_3$ | " | 18 | 6 | 18 | 20.0 | 7 |
| | Br/Sb ratio | wt. ratio | 0.25 | 2.0 | 0.25 | 0.25 | 2.0 |
| Mechanical properties | Tensile strength | Kg/cm$^2$ | 1240 | 1260 | 1370 | 1210 | 1220 |
| | Tensile elongation | % | 3.1 | 3.0 | 3.2 | 3.0 | 3.0 |
| | Flexural strength | Kg/cm$^2$ | 1790 | 1810 | 1930 | 1750 | 1790 |
| | Flexural coefficient | Kg/cm$^2$×10$^4$ | 8.10 | 8.02 | 8.15 | 7.55 | 7.35 |
| | Izod impact strength notched (1/2"t) | Kg.cm/cm | 5.9 | 6.1 | 6.4 | 5.6 | 5.4 |
| | unnotched (1/8"t) | Kg.cm/cm$^2$ | 53.3 | 54.5 | 56.7 | 42.2 | 41.8 |
| | Heat distorsion temp. at 18.6 Kg/cm$^2$ fiber stress | °C | 204 | 200 | 204 | 201 | 203 |
| Flammability | 1/8"t | | 94VE-0 | 94VE-0 | 94VE-0 | 94VE-0 | 94VE-0 |
| | 1/16"t | | " | " | " | " | " |
| | 1/32"t | | " | " | " | " | " |

Table 7

| | Unnotched Izod impact strength retention (%) | | | |
|---|---|---|---|---|
| Experiment No. | EX-514 | EX-515 | EX-517 | EX-518 |
| Br/Sb ratio | 0.25 | 2.0 | 0.25 | 2.0 |
| Heat aging time (days) at 170°C | | | | |
| 0 | 100 | 100 | 100 | 100 |
| 10 | 79 | 60 | 73 | 47 |
| 20 | 70 | 47 | 63 | 37 |
| 30 | 65 | 42 | 58 | 32 |
| 40 | 63 | 39 | 52 | 30 |
| 50 | 62 | 39 | 51 | 29 |
| 60 | 62 | 37 | 50 | 26 |

Table 8

| Experiment No. Polyesters | | | EX-519 PET | | EX-520 PET/PBT=30/70*² | | EX-521 PBN*³ | | EX-522 PHN*⁴ | | EX-523 PE-99*⁵ | |
|---|---|---|---|---|---|---|---|---|---|---|---|---|
| Flame retardant Composition | DBE | | 5 | 12 | 5 | 12 | 5 | 12 | 5 | 12 | 5 | 12 |
| | Sb$_2$O$_3$ | | 20 | 6 | 20 | 6 | 20 | 6 | 20 | 6 | 20 | 6 |
| | Br/Sb ratio | | 0.25 | 2.0 | 0.25 | 2.0 | 0.25 | 2.0 | 0.25 | 2.0 | 0.25 | 2.0 |
| Durability for thermal degradation | Unnotched Izod impact strength | Kg.cm/cm$^2$ | 49 | 51 | 54 | 53 | 52 | 50 | 52 | 48 | 53 | 51 |
| | Retention (150°C, 60 days) | % | 82 | 55 | 80 | 45 | 75 | 49 | 78 | 42 | 74 | 38 |
| Flammability | 1/8"t | | 94VE-0 | | 94VE-0 | | 94VE-0 | | 94VE-0 | | 94VE-0 | |
| | 1/16"t | | " | | " | | " | | " | | " | |
| | 1/32"t | | " | | " | | " | | " | | " | |

*¹Polyethylene terephthalate [η]: 0.72
*²PET ([η]: 0.72)/PBT ([η]:0.80) = 30/70 (wt. ratio) blend polymer
*³Polybutylene 2,6-naphthalate [η]: 0.76
*⁴Polyhexamethylene 2,6-naphthalate [η]: 0.79
*⁵Poly[ethylene bis α,β-(phenoxy)ethane 4,4'-dicarboxylate [η]: 0.83

What we claim is:
1. A flame retarding thermoplastic polyester composition reinforced by glass fiber which comprises 100 parts by weight of a glass fiber reinforced thermoplastic polyester, 2 to 19 parts by weight of at least one flame retarding agent selected from the group consisting of decabromodiphenylether and decabromodiphenyl, and 12 to 30 parts by weight of antimony trioxide, wherein the ratio by weight of bromine atom to antimony atom is within the range of 0.15 to 0.27, wherein the glass fiber reinforced thermoplastic polyester comprises 98 to 40 parts by weight of thermoplastic polyester and 2 to 60 parts by weight of glass fiber.

2. The composition of claim 1 wherein the glass fiber reinforced thermoplastic polyester comprises 5 to 40 parts by weight of glass fiber.

3. The composition of claim 1 wherein the thermoplastic polyester is constituted by at least one acid component selected from the group consisting of terephthalic acid, 2.6-naphthaline dicarboxylicacid and 1.2-bis-(4-carboxy-phenoxy)ethane, and at least one diol component selected from the group consisting of aliphatic glycols having a carbon number of 2 to 6.

4. The composition of claim 1 wherein the thermoplastic polyester is polybutyleneterephthalate.

5. The composition of claim 1 wherein the thermoplastic polyester is polyethyleneterephthalate.

* * * * *